United States Patent [19]

Graves et al.

[11] 3,790,756

[45] Feb. 5, 1974

[54] BAR CODE READING CIRCUITRY

[75] Inventors: Kenneth E. Graves, Saratoga; Kay Madsen, San Jose; Warren J. Schmidt, Sunnyvale, all of Calif.

[73] Assignee: FMC Corporation, San Jose, Calif.

[22] Filed: Nov. 8, 1972

[21] Appl. No.: 304,870

[52] U.S. Cl. ....................... 235/61.11 E, 250/219 D
[51] Int. Cl. .......................... G06k 7/10, G08c 9/06
[58] Field of Search 235/61.11 E, 61.11 D, 61.12 R, 235/61.12 M, 61.12 N; 340/146.3 K; 250/219 R, 219 D, 219 DC, 219 DD

[56] References Cited

UNITED STATES PATENTS

| | | | |
|---|---|---|---|
| 3,145,291 | 8/1964 | Brainerd | 340/146.3 K |
| 3,654,435 | 4/1972 | Vaccaro | 235/61.12 M |
| 3,676,644 | 7/1972 | Vaccaro et al. | 235/61.12 M |

*Primary Examiner*—Daryl W. Cook
*Attorney, Agent, or Firm*—Robert S. Kelly; C. E. Tripp

[57] ABSTRACT

Circuitry for a bar/half bar code reader which includes a stationary array of photodetectors aligned to scan over a relatively large scan width to detect and decode a data line which occupies only a fraction of the area of the scan width. The circuitry includes counting means for locating the relative position of the bottom of the first bar in the data line with respect to the scan width. The remaining bars in the data line are then tracked by interrogating only the information from those photodetectors which located and analyzed the first bar. Means are also provided for continuously determining the relative position of the bottom of each bar in the data line and for incrementally adjusting the tracking circuitry so that codes which are skewed with respect to the scan width can be successfully tracked.

14 Claims, 7 Drawing Figures

BAR CODE READING CIRCUITRY

BACKGROUND OF THE INVENTION

1. Field of the Invention

The present invention pertains to the detecting circuitry used in code reading devices, and more particularly, it pertains to the circuitry in apparatus for reading bar/half bar codes, such as might be used in the routing of envelopes or packages for example.

2. Description of the Prior Art

In recent years automatic sorting systems have come into greatly increasing use in fields such as warehousing or mail processing. The rapid advances in electronics and concurrent rapid advances in labor wage scales have created the fast developing field of code reading to allow for automatic sorting of articles. For example, codes of various sorts are printed on the sides of boxes or upon the surfaces of letters with the boxes or letters being run past a reader which detects the code and causes subsequent discharge apparatus to direct the articles to particular locations in accordance with the information which was decoded.

While there are several different basic types of coding systems in general use today, one of the most widely used for simple sorting operations is the bar/half bar coding system wherein a regular series of spaced bars are printed in a predetermined location and in a line on the article to be sorted, for example a letter. Each bar is either tall or short and is detected as such in order to provide conventional binary code information. While the data, which will consist of a line of regularly spaced bars or half bars, is printed in a pre-determined location on the article, it will be recognized that it is difficult, if not impossible, to precisely locate the data with respect to the code reading device. Either during the printing of the code upon the article or during the transport of the article past the code reading device, the code may become skewed or otherwise misoriented with respect to the code reading device. Furthermore, the imperfections of the code printing devices, the imperfections in the surfaces of the articles (letters or packages) being printed, and damage to or deflections in the code printed article may also lead to misorientation errors or non-uniform bars which would cause the reader to misinterpret the information being received. Unless some means are provided to correct for the misorientation between the data and the reading device, errors will be made in the detection.

In order to eliminate the errors which might be introduced by the aforementioned inherent causes of misorientation and non-uniformity of the code data, the code reading devices in use today generally rely upon a scanning system which is adapted to scan over an area considerably wider than the area in which the code date is received. Thus, it can be seeen that skewed data lines and slightly misaligned data lines will be accommodated within the reading zone of the code reading device. Such wide scan code reading devices include complex logic circuitry for preventing the introduction of errors due to misorientation of the data with respect to the reader, false markings such as smudges and pencil marks in the data area, and poor quality code data printing.

Generally speaking, the code reading devices of the prior art that are designed to handle bar/half bar code systems are adapted to scan over a wide area, determine the location of printed matter within the area of the scan, and perform various logic operations in order to determine whether or not they are receiving data and if such data is valid. Because of the complex circuitry required for these logic operations the code reading devices of the prior art have generally been expensive both to construct and to maintain. Furthermore, such devices have been limited as to the maximum permissible skew of the data line with respect to the scan width and as to the extent and nature of the permissible invalid markings in the area of the data line.

SUMMARY OF THE INVENTION

With the circuitry of the present invention a system is provided wherein many of the problems of the prior art devices have been eliminated. The circuitry is adapted to receive the outputs from a series of aligned photodetecting devices which cover a scanning width significantly greater than the maximum height of any of the bars in the data line. When the first bar of a line of data is received and recognized as such, the bottom of the bar is located with respect to the scan width of the detecting device, and the remainder of the data line is tracked with respect to the location of the bottom of the first bar. Thus, the interrogated viewing area of the code reader is considerably decreased; that is to say, only a very small portion of the total viewing area must be checked on each scan in order to fully evaluate the data. Means are also provided to determine the relative position of the bottom of each bar in the data line and to compare it with the relative position of the previously scanned bar so that the tracking circuitry can be continuously adjusted when the data is skewed with respect to the scan width.

The circuitry for accomplishing the foregoing has important advantages over prior art circuitry in greatly reducing or eliminating the inherent noise problems, the data misalignment problem, and the problems associated with the occurrence of erroneous markings in the scanning area. The circuitry of the present invention is relatively non-complex and can be constructed without undue expense. Furthermore, the simplicity of the circuitry should reduce the required servicing and maintenance.

DESCRIPTION OF THE PREFERRED EMBODIMENT

Figure 1:
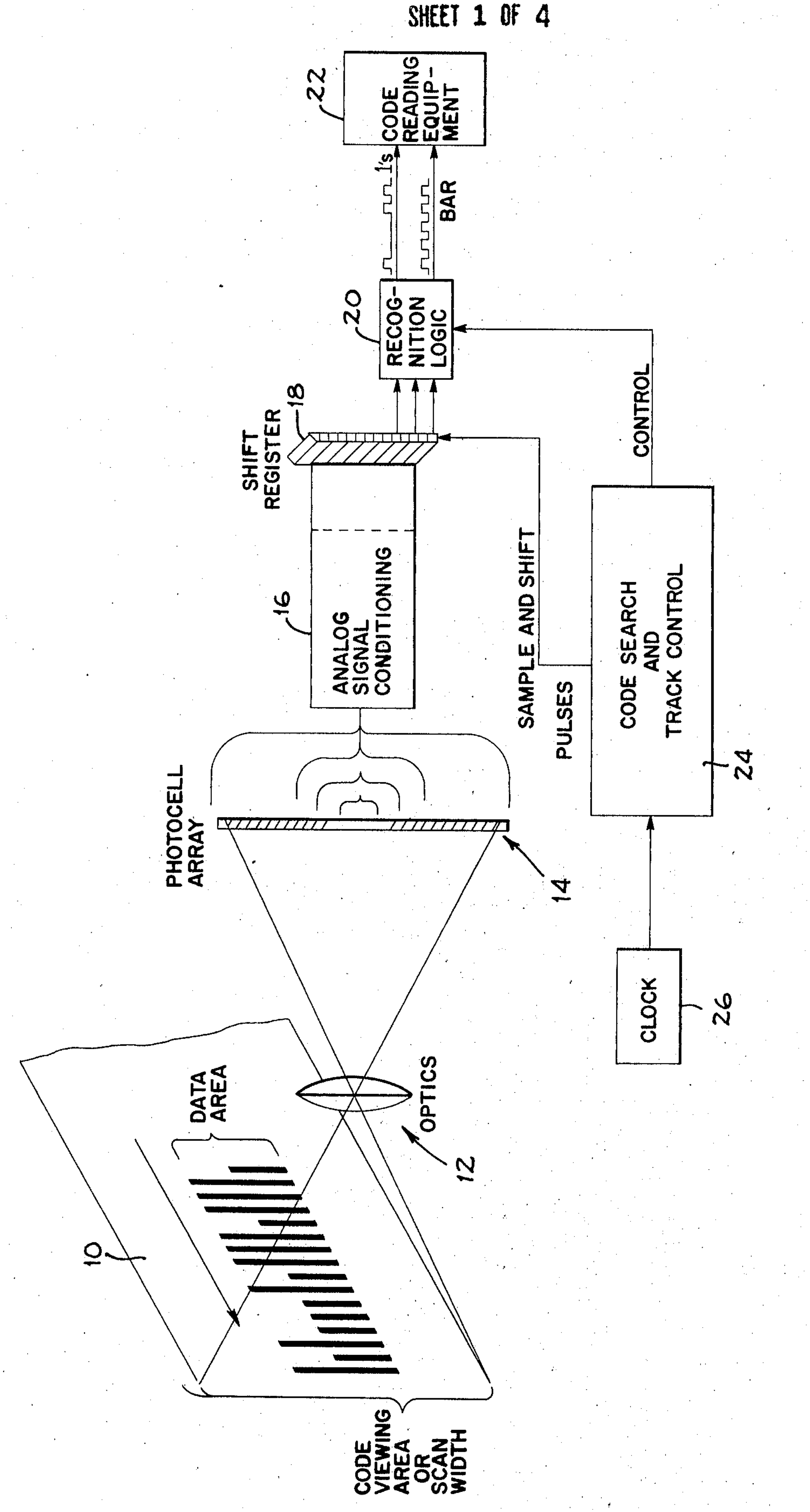
FIG. 1 is a diagrammatic, block diagram illustration of a bar/half bar code reader utilizing the circuitry of the present invention.

The general logic block organization of the bar code reading circuitry of the present invention is shown in FIG. 1. The data to be read, which consists of a spaced series of either tall or short bars, is placed in a line of data on an article 10, such as a letter, having a flat surface. The article is then moved, in the direction of the arrow, so that the bar code data is moved past the code reading device. As with conventional code reading devices, an optical arrangement 12 and an aligned array of photodetectors 14 are utilized to scan over a predetermined width on the article 10 which width will include the area in which the line of bar code data is printed. As shown in FIG. 1, the viewing area, i.e., the scan width, is much greater than the width of the bar code data. In the preferred embodiment of the present invention, this scan width is approximately three times the data width which difference is necessary in order to insure that the code reading device will scan over an area which always includes the code data. Due to imperfections in the code printed articles and due to possible misalignment of the article with the article conveying equipment it is quite possible, if not probable, that the data will not be perfectly oriented with respect to the photodetector array. Thus, the relatively wide scan width allows for skewed data as well as other types of misalignment.

The individual photocells in the photodetector array 14 are adapted to receive the light reflected from small segmental areas aligned vertically on the article 10, with each adjacent pair of photocells receiving the reflected light from a corresponding pair of adjacent segmental areas. The output of each photocell is dependent upon the amount of reflected light received by the photocell and is, therefore, dependent upon whether or not the segmental area being viewed includes code printing. The output signals of the photocells are each individually processed through a conventional analog signal conditioning circuit 16 to obtain logic level signals which are directed, by means of parallel transfer circuitry, into a shift register 18. A code search and track control circuit, indicated by the general reference numeral 24, provides shift pulses to serially shift the information in the shift register until the cell at the output end of the shift register indicates the presence of code printed data in the viewing area, i.e., until the representation of the bottom of a code bar is at the bottom of the register. The presence of a bar and its character, i.e., tall or short, is then determined by recognition logic circuitry 20 which provides an output to code reading equipment 22 that may take any conventional form. A clock 26 is used to control the operation of the code search and track control circuitry 24 so that the shift register 18 will be serially shifted a sufficient number of times to move information from one scan completely out of the register before the information from a new scan is processed and transferred in parallel into the register.

Figure 2:
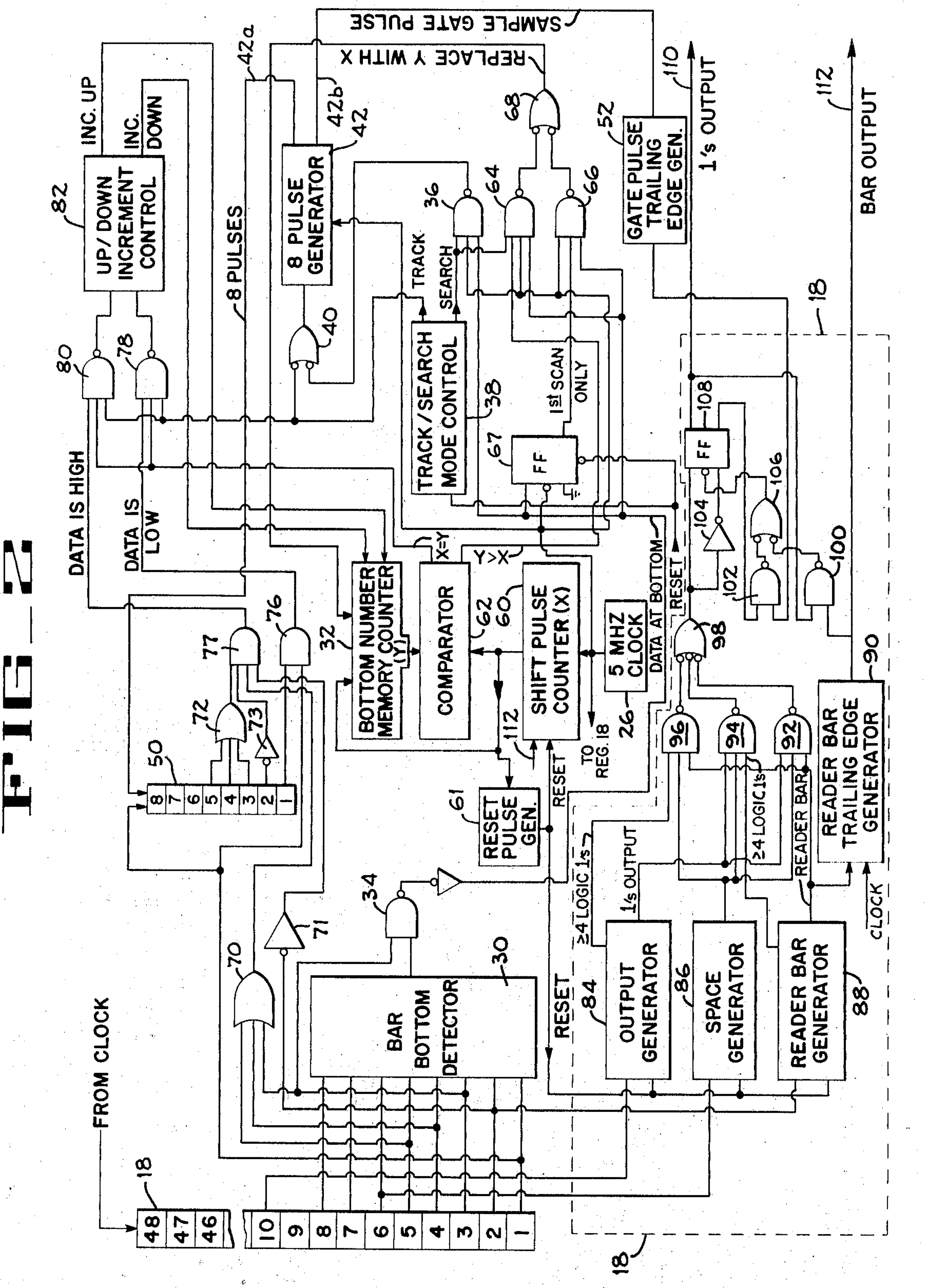
FIG. 2 is a schematic representation of the bar code reading circuitry of the present invention.

The circuitry of the present invention is designed to operate so that each bar will be vertically scanned several times with the number of scans being dependent upon the width of the bar, the rate of travel of the article 10 past the code reading device, and whether or not the data is skewed with respect to the photocell array. At the start of each scan interval, data from each of the photocells of the photodetector array, after amplification and processing, are transferred simultaneously into the shift register 18. As shown in FIG. 2, this shift register 18 is a 48 bit shift register, i.e., one having 48 serially connected cells. A shift register cell will contain a logic "1" if the corresponding segmental area is covered by code printing; otherwise, the cell will contain a logic "0." Hence, the data stored in the shift register immediately after the parallel transfer of scan information will be an electrical representation of the bar image on the photodetector array.

When the data is transferred into the shift register, it is then serially shifted down 48 times, i.e., it is shifted by the number of cells in the register. After the 48 shifts, all of the data will be shifted out of the register, and the register will receive data from the next scan so that the next clock pulse can reinitiate the serial shifting procedure. Before the information on a scan is transferred out of the register, however, a bar bottom detector 30 (FIG. 2) is activated when valid bar data information reaches the bottom of the register, and the number of shift pulses required to bring the data to this point in the register is stored in a bottom number memory counter 32 (when the first bar of a line of data is being scanned only). With the register and circuitry of the present invention, cell 2 is considered to be the register's bottom since cell 1 is reserved for use only when the circuitry is in the "tracking" mode as will be explained in greater detail hereinafter.

Figure 3:
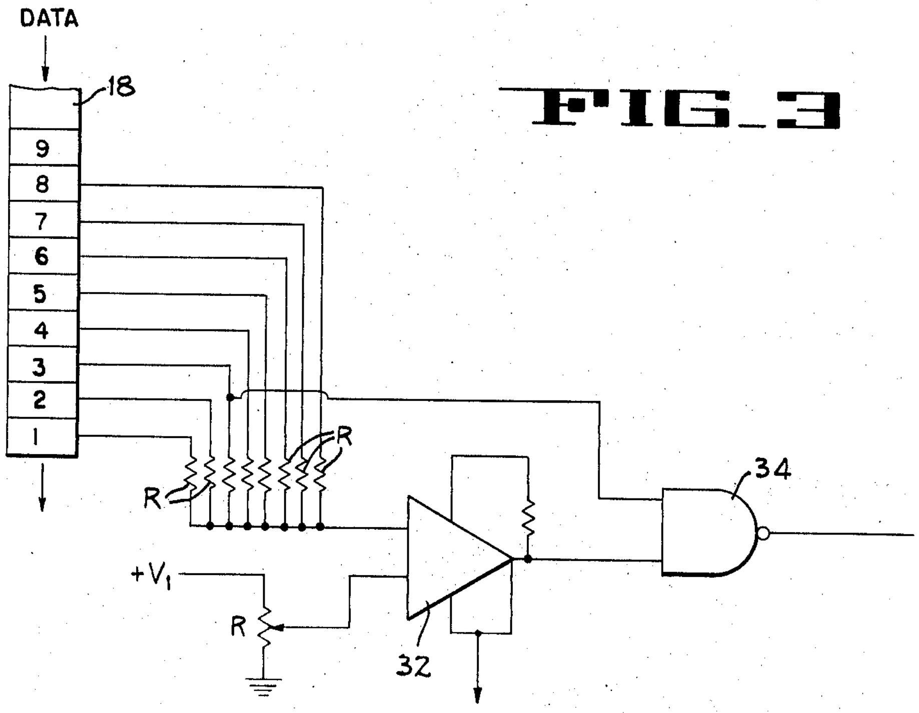
FIG. 3 is a schematic representation of the circuitry for the bar bottom detector shown in FIG. 2.

The circuitry for the bar bottom detector 30 is shown in detail in FIG. 3. Each of the lower eight cells of the register 18 are serially connected through a resistor R to a common input to a differential amplifier 32. The other input to the differential amplifier is set at a threshold voltage which is some predetermined percentage of a voltage $V_1$ which represents the output voltage of a cell in the register 18 when a logic "1" is indicated. For example, if the output voltage of a cell is 5 volts for a logic "1" and zero volts, or ground potential, for a logic "0," then the threshold voltage would be set at something just slightly less than half of the 5 volts. When four or more of the first eight cells indicate logic "1's," it will be appreciated that the voltage on the upper input of the differential amplifier 32 will be higher than the threshold voltage and an output signal from the bar bottom detector will be obtained. This is one required condition of the register for detecting the bottom of a bar. As a second condtion, cell 3 of the register must have a logic "1" output, and thus, the output of the operational amplifier 32 is "anded" with the output of cell 3 of the register in NAND gate 34. Summarizing the operation of the bar bottom detector 30 during the processing of information from a single scan, it will be seen that the register will be shifted until logic information indicating the bottom of a code bar is placed in cell 3. This signal plus the bar validity signal from the differential amplifier 32 are applied to the NAND gate 34 to provide an output signal pulse.

Referring now to FIG. 2, it will be seen that the signal from the NAND gate 34 (indicating the bottom of a bar) is directed to a NAND gate 36. This NAND gate also has enabling inputs from the clock 26 and from track/search mode control circuitry 38, the latter circuitry comprising a two-position electronic switch. During the initial scans of a data line, the mode control circuitry will be in the position indicated as "search"

and, therefore, will provide an enabling input to NAND gate 36. Once the first data bar is recognized and moved out of the scanning area, this circuitry is switched into the "track" mode where it will remain for the rest of the data line. With enabling inputs from the bottom detector 30 and from the circuitry 38, NAND gate 36 is activated on the subsequent clock pulse to pulse NAND gate 40 which provides a negative logic "or" function and activates an eight pulse generator 42. This generator is a conventional counter which provides a series of eight pulses synchronized with the clock pulses 26. The generator also includes a monostable multivibrator, or "one-shot" circuit, (not shown) which provides a sample gate pulse. This pulse is a relatively long duration pulse bracketing the eight clock pulses provided by the generator. The eight clock pulses are provided on output line 42*a* where they are directed to a secondary, eight-bit shift register 50, and the sample gate pulse is provided on output line 42*b* where it is directed to a sample gate trailing edge generator 52. The circuitry for generator 52 is entirely conventional and may be similar to the circuitry for the reader bar trailing edge generator 90 shown in FIG. 7 and to be explained in greater detail hereinafter.

In order to better explain the circuitry of the present invention it will be assumed that the clock pulses are generated from a 5 megaHertz oscillator 26 and that a scan input to the primary shift register 18 is obtained once each 9.6 microseconds. Thus, the primary register is able to be shifted 48 times and cleared before the information from the next scan is transferred thereto.

Activation of the eight-bit shift register 50 causes information to be transferred from cell 1 of the register 18 into cell 8 of register 50 and thereafter to be serially shifted from the primary register 18 into the secondary register 50 until the information in register 50 is exactly the same as the information in the bottom eight cells of the register 18 at the time when the secondary register 50 was activated. This will be the time when the bottom of a bar is indicated in cell 2 of the primary register 18, i.e., one clock pulse after the bottom of the bar is detected in cell 3 of primary register 18. Obviously, the shifting of register 50 is synchronized with the clock pulses which shift the register 18. The purpose of the secondary register 50 is for use in the "tracking" mode during the recognition and detection of those bars in a data line which follow the initial bar which purpose will be explained further hereinafter.

If on any scan, the bottom detector circuitry is not activated (i.e., no recognition of a bar) the data in the various circuits is ignored and no further action is taken. Once the first bar in a data line is recognized on any single scan, the circuitry previously described is placed in operation. During subsequent scans of the first bar, the number in the bottom number memory counter 32 may be changed to make sure that this number represents the minimum number of shift pulses to move the logic level which is indicative of the bottom of the bar to the bottom (cell 2) of the primary register 18. This will assure that the bottom of the bar is correctly located in those instances where the bar may be skewed with respect to the vertical scan width.

It will be noted from FIG. 2 that the clock 26 is arranged to continually shift a shift pulse counter 60. For the sake of convenience it shall be assumed that the number appearing in counter 60 at any given time is represented by the reference numeral "X." The shift pulse counter is arranged to count up to 48, i.e., the number of pulses necessary to shift data out of the register 18, and then it is reset by a reset pulse generator 61 which comprises another counter designed to provide an output (reset) pulse upon the accumulation of the requisite count. Thus, the shift pulse counter 60 counts to 48 and is reset back to zero on the next clock pulse following the obtaining of the count. The previously mentioned bottom number memory counter 32 is a register similar to the shift pulse counter 60 with the number in the bottom number memory counter indicating the number of shift pulses that it took to shift the bar bottom logic data to the bottom of register 18—such number being represented by the reference numeral "Y." It will be noted that the activation of NAND gate 34, indicating that bar bottom logic data is at the bottom of register 18, also provides an enabling input to a NAND gate 66. This gate is enabled only one time during the processing of a line of data when a flip-flop 67 is toggled to provide an output pulse thereto, and this will occur on the clock pulse following the bar bottom recognition signal from NAND gate 34. At this time the NAND gate 68 is enabled (negative "or" logic) by NAND gate 66 and an output pulse is directed to the bottom number memory counter 32 so that the number appearing at that time in the shift pulse counter 60 is parallel transferred thereto.

It will also be recognized (FIG. 2) that the outputs of the cells of the registers in counters 32 and 60 are directed to a comparator 62 having a pair of separate outputs—one output being provided when $X = Y$ and the other output being provided when Y is greater than X. During the second and subsequent scans of the first bar of a line of data a NAND gate 64 may be enabled to pass a pulse through gate 68. This will occur when the number Y in the bottom number memory counter is greater than the number X in the shift pulse counter thus indicating that a lesser number of pulses had been required to shift bar recognition data to the bottom of primary register 18. When this condition is obtained, gate 68 provides a pulse which allows the data from the shift pulse counter 60 to be transferred into the bottom number memory counter 32; that is to say, the number Y in the counter 32 is then replaced with the number X in the shift pulse counter.

After the first bar has been successfully scanned the track/search mode control circuitry 38 switches to the "track" mode. The track/search mode control circuitry 38 is a simple electronic switch consisting of two interconnected flip-flops. The circuitry is switched from "search" to "track" by an input pulse on line 112 which indicates that the trailing edge of the first bar in the data line has passed the scanning circuitry and which is obtained from the recognition logic 18 in a manner to be explained further hereinafter. The control circuitry 38 will then not be reset until the end of the data line and will remain in the "track" mode.

As the vertical space between the first and second bars of a data line is scanned, a series of logic "0's" will be placed in the primary register 18 and will be shifted to the secondary register 50 when comparator 62 indicates that the number X in counter 60 equals the number Y in the counter 32. This process continues until the first scan of the second bar in the data line. The pertinent 8-bit portion of the data from the first scan of the second bar is transferred from primary register 18 to secondary register 50 in the manner previously explained. Then, the information from the second scan of the second bar is placed in the primary register 18. When this information in the primary register 18 has been shifted down to the position representative of the bottom of the previously scanned bar, i.e., Y times, a comparison between the information in the registers 18 and 50 is made by the inverters 71 and 73, OR gates 70 and 72, and AND gates 76 and 77. The OR gates 70 and 72 are connected to the cells 3, 4 and 5 in the primary register 18 and in the secondary register 50 respectively. The inverters 71 and 73 are connected to the output of cell 2 of the primary register and the output of cell 2 of the secondary register respectively. If the bottom of the second bar is located in the same relative position with respect to the photodetector array as was the bottom of the first bar, cell 1 of each of the registers will contain a logic "0" and cell 2 of each of the registers will contain a logic "1." If the second bar is moving down with respect to the first bar, cell 1 (in both registers) will contain a logic "1." If the second bar is moving up with respect to the first bar, cell 2 (in both registers) will contain a logic "0." In addition, at least one of cells 3, 4 or 5 in both registers must have a logic "1" output to insure that a space is not being observed. Signals from each of gates 70, 71, 72 and 73 are then "anded" together through AND gate 77. Gate 77 thereby serves to indicate that the data (bar location) is high, or moving up, with respect to the previous data (i.e., the previous bar location). Also, cell 1 of the register 18 and cell 1 of the register 50 enable the AND gate 76 whereby if these cells indicate logic "1's" it is ascertained that the second bar is moving down with respect to the first bar and an output pulse is provided. Since the information from both registers 18 and 50 must be the same before the signals from gates 76 and 77 can be obtained, it will be recognized that two successive scans must indicate that the bar is either moving up or moving down before any incrementive action can be taken. This prevents a false indication that a bar is high from being made when the bars are skewed so that only the top portion of the bar is crossed with the first scan.

The outputs of AND gates 76 and 77 are directed to NAND gates 78 and 80 respectively. These gates are enabled by the "track" signal from the track/search mode control circuitry 38 and by a signal ($X = Y$) from the comparator 62 when the number in the shift pulse counter 60 equals the number in the bottom number memory counter 32, i.e., when the registers 18 and 50 are provided with the same information relative to the scan width that of the previously tracked bar. A negative pulse from NAND gate 80 or a negative pulse from NAND gate 78 is directed to up/down increment control circuitry 82 to either increment the number in the bottom number counter 32 upwardly or downwardly by one count. If the bar is ascertained to be moving up, the up/down increment control circuitry increases the number in the bottom number memory counter by one. If the bar is ascertained to be moving down, the number is decreased by one. Tracking in increments of one count per bar provides sufficient latitude to track code patterns and yet avoids the possibility of wide tracking swings caused by defects in the code pattern.

Figure 4:
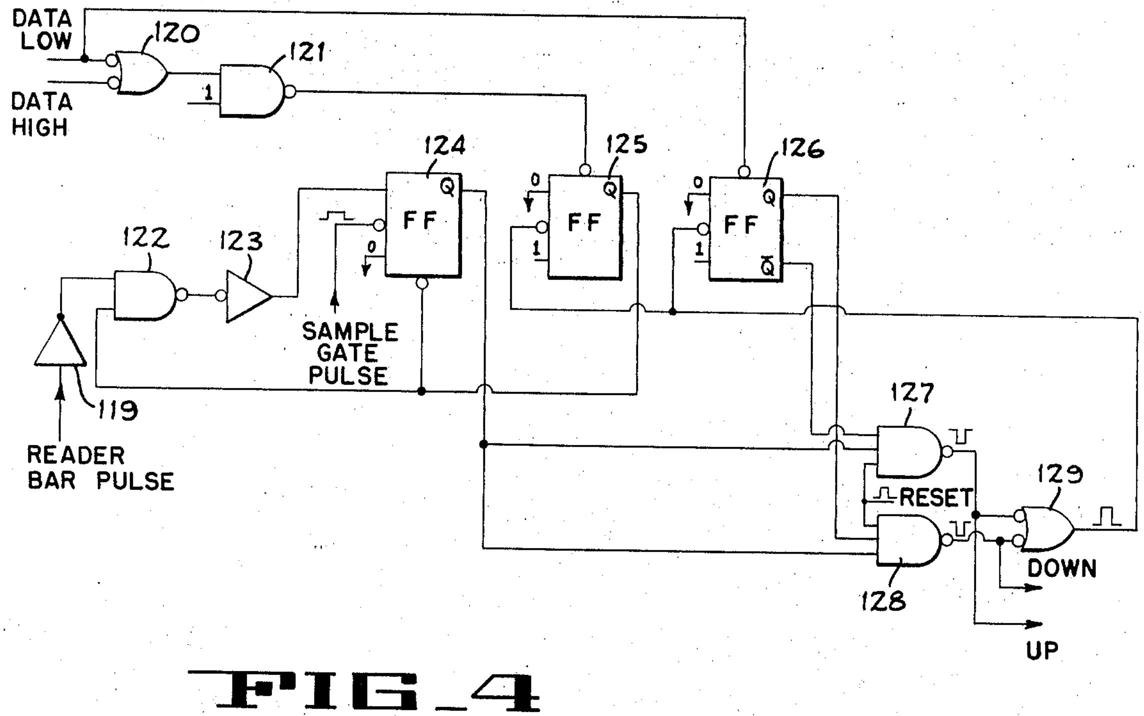
FIG. 4 is a schematic representation of the circuitry for the up/down increment control shown in FIG. 2.

The specific circuitry for the up/down increment control 82 is shown in detail in FIG. 4. The outputs from NAND gates 78 and 80 are directed to a NAND gate 120 which applies negative "or" logic. The output of gate 120 is inverted by an inverter 121 and directed to the set input of a J-K flip-flop 125. The low data indication from NAND gate 78 is directed to the set input of a second J-K flip-flop 126. Thus, when the primary and secondary shift registers 18 and 50 are examined, in the manner previously explained, flip-flop 125 will be set if the data is high or low, and flip-flop 126 will be set only if the data is low. A third J-K flip-flop 124 is utilized to generate the output pulses from the up/-down increment control circuitry. When the flip-flops 125 and 126 are set, a reader bar pulse will be produced (by means to be explained in detail hereinafter). This reader bar pulse is inverted by inverter 119 and applied to one of the inputs to a NAND gate 122. The output of NAND gate 122 is inverted by inverter 123 and applied to the input of flip-flop 124. If flip-flop 125 has been set (data either high or low) NAND gate 122 will be enabled so that the flip-flop 124 will be triggered on the trailing edge of the reader bar pulse, i.e., as the reader bar pulse goes to a logic "0" condition. The output of flip-flop 124 will then be a logic "1." This condition provides NAND gates 127 and 128 with one out of three enabling inputs. The condition of flip-flop 126 will determine which of the NAND gates 127 or 128 is enabled and, at the end of the scan, a reset pulse (from reset pulse generator 61) provides the other enabling input so that the bottom number memory counter 32 will be incremented upwardly or downwardly by one count. The outputs of NAND gates 127 and 128 also enable a NAND gate 129 (negative "or" logic) to reset the flip-flops 125 and 126 for the next bar in the data line. These flip-flops cannot be set again until a new reader bar pulse is produced when the next subsequent bar is detected by the circuitry. This means that the up/down increment control circuit can be triggered only once for every bar. This fact will be more apparent when the bar recognition logic is discussed in greater detail in connection with FIG. 5 of the drawings.

The output of the up-down increment control circuit 82 is therefore a single pulse from either NAND gate 127 or NAND gate 128 which increments the number in the bottom number memory counter 32 by one either upwardly or downwardly thereby indicating that the bar code data is either moving up or down. In the tracking mode, the tracking of a bar does not actually begin until the second scan of the bar. The registers are examined when the pertinent portion of the current scan reaches the bottom of the primary register 18 (the bottom being cell 2 as previously pointed out) but before the secondary eight-bit register 50 is shifted so that it still contains the data from the previous scan. At the first scan of a bar, therefore, the secondary register 50 still contains logic "0's" from the scans of the space preceding the bar. These logic zeros inhibit the up/-down increment control circuit 82.

The recognition logic circuitry 18 is shown at the bottom of FIG. 2. Primarily, the function of the recognition logic is to correct for skewed codes and to produce a pair of outputs which decode the bar code and may be used by code reading equipment or computer interfacing equipment. The two outputs, which are provided on output lines 110 and 112, will (1) identify the existance of a bar (bar output 112) and (2) indicate whether the bar is tall or short (1's output 110). Thus, all of the binary coding information is contained in the plural outputs from the recognition logic circuitry. One of these outputs, indicated by the numeral 112 in FIG. 2, is a pulse which is generated for every bar in the code pattern. If the bar is also a tall bar, a pulse is produced at the other output indicated by the numeral 110 in FIG. 2.

While the pulses from the eight pulse generator 42 are shifting the secondary register 50, the bits passing cells 2, 6 and 10 of the primary register 18 are being monitored by the recognition logic circuitry. More specifically, cell 2 is monitored by a reader gas generator 89, cell 6 is monitored by a space bar generator 86, and cell 10 is monitored by a 1's output generator 84. Since the process is initiated when the tracked or pertinent portion of the data reaches the bottom (cell 2) of the register 18, the lower part of the tracked portion of the data will pass cell 2, a middle part of the tracked portion of the data will pass cell 6, and the top part of the tracked portion of the data will pass cell 10. Each of the generators 84, 86, and 88 will produce an output pulse once it is determined that the portion of the data which it is monitoring indicates the presence of a bar in the scan area—that is to say, that a true code bar is being scanned rather than merely false or erroneous markings. A significantly skewed bar will have only a portion of its length represented by logic "1's" in the register during a given scan. Four out of the eight bits which are monitored by the generators during a scan must be logic "1's" before an output pulse is produced by a generator. Once a pulse is produced it lasts for four scan intervals. After four scan intervals and during a scan when three or fewer logic "1's" are detected the generator terminates the pulse. A minimum of four scan intervals must elapse before the next pulse can be generated.

The outputs from the generators 84, 86 and 88 are tied to the various enabling inputs of a set of NAND gates 92, 94 and 96 as shown in FIG. 2. The outputs of any of the NAND gates 92, 94 and 96 operate with negative "or" logic to enable a NANG gate 98 and set a conventional J-K flip-flop 108. The flip-flop 108 is reset by means of the NAND gates 100, 102 and 106 upon the reception of a pulse from the reader bar trailing edge generator 90.

Flip-flop 108 can be set by gate 92 to produce a 1's output indication when the output pulses from the three generators 84, 86 and 88 initially coincide, and it will reset on the trailing edge of the reader bar trailing edge generator pulse. This insures that the trailing edges of both the 1's output pulse and the bar output pulse will coincide thus providing coincident data recognition signals for subsequent circuitry to recognize and process. The gates 94 and 96 provide for slightly greater permissible skew in the bar being scanned by providing a 1's output signal a few counts before the gate 92 would be activated in a manner which will become more apparent when the details of the generator circuit 88 (FIG. 5) are considered.

Figure 5:
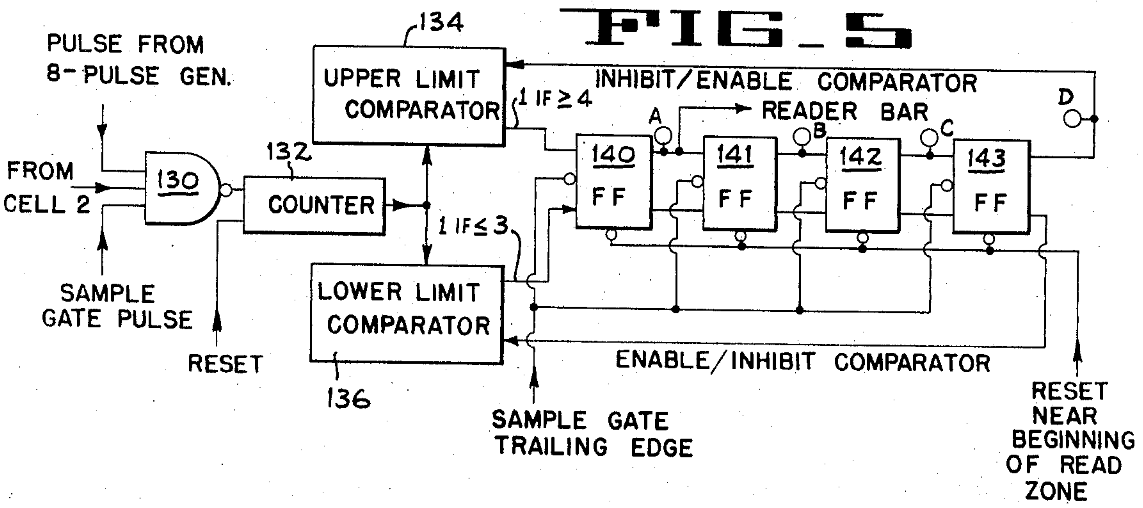
FIG. 5 is a schematic representation of the circuitry for the reader bar generator shown in FIG. 2.

The reader bar generator 88 is shown in detail in FIG. 5. Generators 84 and 86 are similar and therefore will not be described in detail. A NAND gate 130 is provided which is enabled by positive logic signals from cell 2 of the register 18, the pulses from the eight pulse generator 42, and the sample gate pulse which brackets the eight pulses used in shifting information into the secondary register 50. A counter 132 is connected to receive the output from NAND gate 130 and to count the number of times that cell 2 indicates the presence of a logic "1" in each set of eight shift pulses from the generator 42. After the eight pulses, the counter 132 will be reset by the reset pulse from reset pulse generator 61. The output of counter 132 is tied in parallel to an upper limit comparator 134 and to a lower limit comparator 136. The upper limit comparator is hard wired to a binary 4 count so that an output is provided to the upper input of a flip-flop 140 if the count in counter 132 is equal to or greater than four. The lower limit comparator is hard wired to a binary three count so that an output is provided to the lower input of the flip-flop 140 when the number in the counter is less than or equal to three. The trailing edge of the sample gate pulse is used to clock each of a series of flip-flops 140, 141, 142 and 143 so that the aforedescribed information will be successively transferred through the flip-flops from terminal A to terminal D in four successive scans. When the lower limit comparator 136 is enabled, the upper limit comparator 134 will be inhibited and vice versa. Once the four successive scans are completed, the comparator which was enabled will then be inhibited and vice versa. It will be seen that the reader bar pulse is generated at the terminal A and will remain for four successive scan intervals. After the decoding of a complete data line, each of the flip-flops 140–143 will be reset prior to the beginning of a new read zone as shown.

Figure 6:
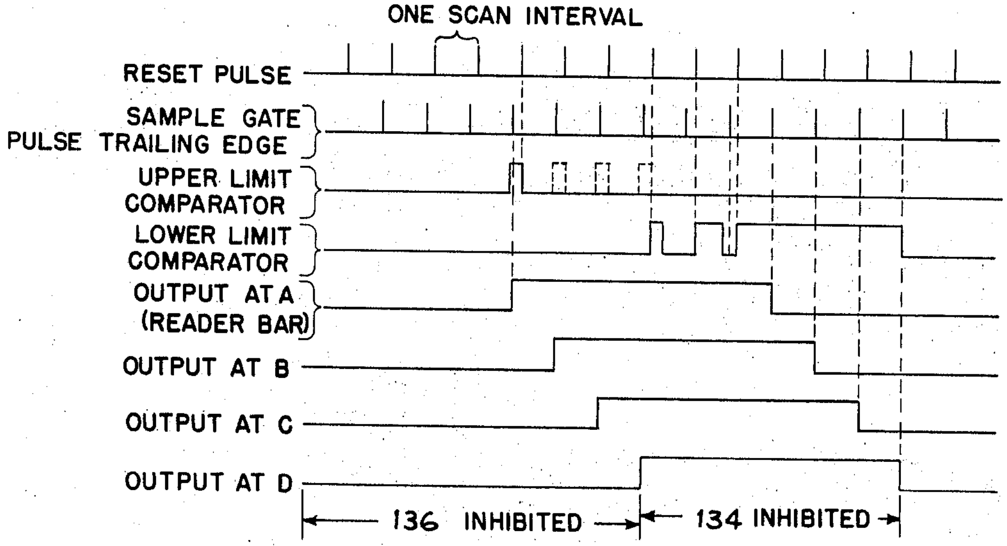
FIG. 6 illustrates the signals presented by various elements of the circuitry of FIG. 5 and particularly illustrates the relative timing of the signals.

A schematic diagram illustrating the operation of the reader bar generator is shown in FIG. 6. It is there shown how the reset pulses (from generator 61) and the sample gate trailing edge pulses (from generator 52) which bear a fixed though indeterminate relationship to each other, control the timing of the signals at each of the indicated terminal points.

Figure 7:
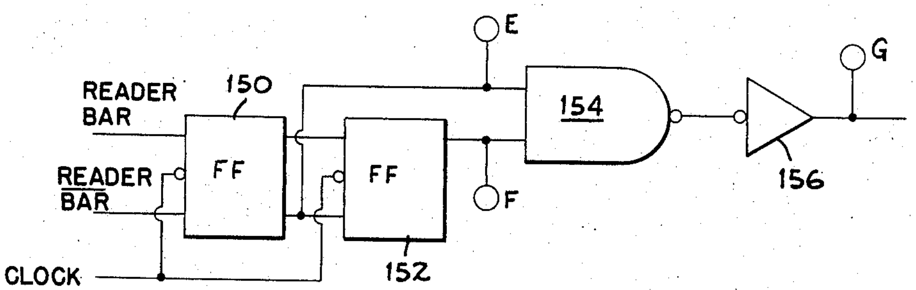
FIG. 7 is a schematic representation of the circuitry for the reader bar trailing edge generator shown in FIG. 2.

FIG. 7 shows the reader bar trailing edge generator 90 in detail. The gate pulse trailing edge generator 52 may comprise a similar circuit. The circuit for generator 90 comprises a pair of conventional J-K flip-flops 150 and 152 which are tied together and provide one of the enabling inputs to a NAND gate 154. The flip-flop 150 is set by the reader bar pulse (from generator 88) and, in turn, sets the flip-flop 152 on the next subsequent clock pulse. Thus, input E to the NAND gate 154 will be low on the next subsequent clock pulse after the leading edge of the reader bar pulse is received and will remain low for one clock pulse after the reader bar pulse is gone. The input F to gate 154, on the output side of the flip-flop 152, will go high one clock pulse after the input E goes low. Input F will also go low one clock pulse after the input E goes high so that both inputs E and F will be high for one clock pulse interval to enable gate 154. The output pulse from gate 154 is passed through an inverter 156 to provide a positive pulse (one clock pulse wide) at terminal G.

Although the best mode contemplated for carrying out the present invention has been herein shown and described, it will be apparent that modification and variation may be made without departing from what is regarded to be the subject matter of the invention.

What is claimed is:

1. In an apparatus for reading bar code data printed on an article which apparatus includes means for continuously scanning over a predetermined scan width on the article that includes an area through which the bar code data is arranged to be passed, said scan width being generally in alignment with but significantly greater than the length of any of the bars in said bar code data, and logic circuit means for interrogating the successive scans to determine the presence of long and short bars and for producing signals in response thereto; the improvement comprising circuitry including means for registering the presence or absence of code marking data within a plurality of incremental areas aligned across said scan width, means for counting the number of incremental areas from one end of said scan width to determine the location of a tracking incremental area as established by the first incremental area which indicates the presence of code marking data to thereby indicate the location of the bottom of the first bar of a line of data with respect to said scan width, logic circuit means for monitoring the incremental areas adjacent to said tracking incremental area to determine whether or not a bar is present, means for interrogating subsequent scans by monitoring the incremental area corresponding to the position of said tracking incremental area and monitoring a sufficient number of adjacent incremental areas to determine the presence of and the height of a bar, and means for altering the corresponding position of said tracking incremental area with respect to said scan width if the bottoms of the bars in the line of data are not aligned with the terminal incremental areas of said scan width whereby said means for interrogating the scan after the presence and location of the first bar of a line of data have been established will be limited to operation over an area significantly smaller than the area of said scan width which smaller area generally corresponds to the location of the line of data within the scan width.

2. In an apparatus for reading bar code data as set forth in claim 1 wherein said circuitry includes a shift register having a plurality of serially connected cells arranged to receive data representative of the presence or absence of code marking data in said incremental areas, means for producing a series of shift pulses for serially shifting the data in said shift register, a counter for counting the number of shift pulses required to shift the code marking data indicative of the bottom of the first bar of said line of data to the output end of the register, memory means for recording said required number of shift pulses, and means responsive to said memory means for initiating said means for interrogating the subsequent scans of said line of data.

3. In an apparatus for reading bar code data as set forth in claim 2 wherein said means responsive to said memory means includes a comparator for comparing the number recorded in said memory means with the number in said counter for counting the shift pulses.

4. In an apparatus for reading bar code data as set forth in claim 1 wherein said means for altering the corresponding position of said tracking incremental area comprises means for monitoring the incremental areas on both sides of said tracking incremental area during said subsequent scans.

5. In an apparatus for reading bar code data as set forth in claim 1 wherein said registering means comprises a shift register including a plurality of serially connected cells, and said logic circuit means for monitoring the incremental areas adjacent to said tracking incremental area includes an analog circuit arranged to measure the logic level outputs of a plurality of said cells at the output end of the register.

6. In an apparatus for reading bar code data printed on an article, a shift register including a plurality of serially connected cells adapted to provide logic levels outputs representative of the presence or absence of code marking in a plurality of segmental areas aligned across a scan width on the article through which the bar code data is arranged to be passed, means for serially shifting the data within said register, means for monitoring the outputs of at least two spaced cells of said register for a predetermined number of shifts, means for initiating said monitoring means when one of said two cells contains a signal from a segmental area indicative of the position of the bottom of the previously scanned bar, said monitoring means including means for counting the number of positive code marking indications from each of the associated cells during said predetermined number of shifts to establish the validity of said data, and logic circuitry for comparing the outputs of the monitoring means associated with each of said cells for determining the presence of and the nature of the bar being scanned.

7. In an apparatus for reading bar code data as set forth in claim 6 wherein said monitoring means includes means for monitoring the output of a third cell of said register for said predetermined number of shifts, said third cell being spaced equally between said other two monitored cells of the register.

8. In an apparatus for reading bar code data as set forth in claim 6 wherein said logic circuitry includes means for producing a first output pulse when the counting means associated with the cell of said two cells which is closest to the output end of the register establishes the validity of said data, said logic circuitry further including means for producing a second output pulse when the counting means associated with both of said two cells simultaneously establish the validity of said data whereby said first output pulse indicates the presence of a bar and whereby the second output pulse indicates the presence of a tall bar.

9. In an apparatus for reading bar code data as set forth in claim 7 wherein said logic circuitry includes means for producing a first output pulse when the counting means associated with the cell of said three cells which is closest to the output end of the register establishes the validity of said data, said logic circuitry further including means for producing a second output pulse when the counting means associated with each of said three cells simultaneously establish the validity of said data whereby said first output pulse indicates the presence of a bar and whereby the second output pulse indicates the presence of a tall bar.

10. In an apparatus for reading bar code data as set forth in claim 6 including a shift pulse counter for counting the number of shifts required from the time data is placed in said register until the bottom of the first bar of a line of data is indicated by the logic level output of the cell of said two cells in said register which is closest to the output end of the register, memory means for storing the number obtained by said shift pulse counter, means for causing said shift pulse counter to count the number of shifts required to serially shift data out of said register during scans of the remaining bars in said line of data, and comparator means for comparing the number in said shift pulse counter with the number in said memory means during scans of subsequent bars in said line of data in order to initiate said monitoring means.

11. In an apparatus for reading bar code data as set forth in claim 10 including means for incrementing the number in said memory means either upwardly or downwardly after the scanning of each bar in said line of data when the bars are skewed with respect to said scan width.

12. In an apparatus for reading bar code data printed on an article, a first shift register including a plurality of serially connected cells, a second shift register including a plurality of serially connected cells, said second shift register being connected to receive data serially shifted from said first shift register, means operative during a first scan for transferring data in parallel into said first shift register representative of the presence or absence of code marking in a plurality of segmented areas aligned across a scan width on the article through which scan width the bar code data is arranged to be passed, means for serially shifting said first register so that the cells at the output end of the register indicate the presence in said scan width bar in a line of bar code data, means for serially shifting information from said first register into said second register when said output end of the first register indicates the presence of a bar, means for comparing corresponding cells of said first and second registers after the first register has received information from a second scan and such information has been shifted the same number of times as the previously scanned information before it was transferred into said second register, and means responsive to said last named means for determining the presence of a bar and its position relative to the previously scanned bar.

13. In an apparatus for reading bar code data printed on an article, a shift register including a plurality of serially connected cells, means for transferring data in parallel into said shift register representative of the presence or absence of code marking data in a plurality of segmented areas aligned across a scan width on the article through which scan width the bar code data is arranged to be passed, means for serially shifting said register so that the cells at the output end of the register indicate the presence in said scan width of the first bar in a line of bar code data, means for recording the number of shift pulses required to thus shift said register, an analog network to monitor certain of the cells at the output end of the register to establish the validity of said first bar, and means operative to serially shift said register by the same number of shift pulses on subsequent scans of said line of data prior to the interrogation of said cells for establishing the presence or absence of the remaining bars in said line of data.

14. In an apparatus for reading bar code data as set forth in claim 13 including means for incrementally altering said recorded number of pulses if the line of data is skewed with respect to said scan width.

* * * * *

UNITED STATES PATENT OFFICE
CERTIFICATE OF CORRECTION

PATENT NO. : 3,790,756

DATED : May 1, 1975

INVENTOR(S) : KENNETH E. GRAVES et al

It is certified that error appears in the above--identified patent and that said Letters Patent are hereby corrected as shown below:

Col. 4, line 48, change "condtion" to -- condition --.

Col. 9, line 10, delete "gas" and insert -- bar --.

line 11, change "89" to -- 88 --.

line 39, change "nang" to -- NAND --

Col. 11, line 67, change "levels" to -- level --.

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*